(12) United States Patent
Dunker et al.

(10) Patent No.: US 8,930,886 B2
(45) Date of Patent: Jan. 6, 2015

(54) IDENTIFYING APPLICATION RESOURCES THROUGH IMPLICIT APPLICATION MODELS

(75) Inventors: Jeremy Dunker, Boston, MA (US); Eric Jewart, Waltham, MA (US); Derrick Timothy Isoka, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 13/327,480

(22) Filed: Dec. 15, 2011

(65) Prior Publication Data

US 2013/0159962 A1    Jun. 20, 2013

(51) Int. Cl.
*G06F 9/44* (2006.01)

(52) U.S. Cl.
USPC ............................... 717/104; 717/120

(58) Field of Classification Search
USPC .......................................... 717/104
See application file for complete search history.

(56) References Cited

U.S. PATENT DOCUMENTS

| | | | |
|---|---|---|---|
| 5,835,777 A * | 11/1998 | Staelin | 717/175 |
| 7,093,147 B2 * | 8/2006 | Farkas et al. | 713/320 |
| 7,181,731 B2 * | 2/2007 | Pace et al. | 717/136 |
| 7,284,265 B2 | 10/2007 | Choy et al. | |
| 7,725,496 B2 | 5/2010 | Paval | |
| 7,788,536 B1 * | 8/2010 | Qureshi et al. | 714/38.14 |
| 7,962,470 B2 | 6/2011 | Degenkolb et al. | |
| 8,001,611 B2 | 8/2011 | Nelson et al. | |
| 8,504,994 B2 * | 8/2013 | Golender et al. | 717/128 |
| 8,578,348 B2 * | 11/2013 | Fliess et al. | 717/135 |
| 8,756,586 B2 * | 6/2014 | Khanapurkar et al. | 717/130 |
| 2003/0051236 A1 * | 3/2003 | Pace et al. | 717/177 |
| 2004/0046785 A1 * | 3/2004 | Keller | 345/734 |
| 2005/0021742 A1 * | 1/2005 | Yemini et al. | 709/224 |
| 2005/0055692 A1 * | 3/2005 | Lupini et al. | 717/174 |
| 2005/0120344 A1 | 6/2005 | Asare et al. | |
| 2006/0184926 A1 * | 8/2006 | Or et al. | 717/168 |
| 2007/0050427 A1 * | 3/2007 | Atkin et al. | 707/201 |
| 2007/0150852 A1 | 6/2007 | Balderas et al. | |
| 2007/0250629 A1 | 10/2007 | Blanding et al. | |
| 2009/0199175 A1 * | 8/2009 | Keller et al. | 717/178 |
| 2009/0204941 A1 * | 8/2009 | Moore et al. | 717/107 |
| 2009/0204942 A1 * | 8/2009 | Kimmerly et al. | 717/110 |
| 2009/0328008 A1 * | 12/2009 | Mital et al. | 717/129 |
| 2011/0131252 A1 | 6/2011 | Son et al. | |
| 2011/0145795 A1 * | 6/2011 | Khanapurkar et al. | 717/126 |
| 2011/0177774 A1 | 7/2011 | Gupta et al. | |
| 2012/0090025 A1 * | 4/2012 | Milner et al. | 726/22 |
| 2013/0159962 A1 * | 6/2013 | Dunker et al. | 717/104 |

OTHER PUBLICATIONS

"Optimizing Virtualization Management with Automated Application Discovery", Retrieved on: Oct. 24, 2011, Available at: http://www.vmware.com/files/pdf/vmware-vcenter-app-discovery-mgr-virtualization-mgm-WP-EN.pdf.

* cited by examiner

*Primary Examiner* — Don Wong
*Assistant Examiner* — Marina Lee
(74) *Attorney, Agent, or Firm* — Kate Drakos; David Andrews; Micky Minhas

(57) ABSTRACT

Determining a discrete application boundary. A method includes identifying one or more initial components of an application. The method further includes identifying statically and/or dynamically related components of the one or more initial components of the application. Identifying statically related components and identifying dynamically related components is performed iteratively. The method further includes identifying a discrete boundary for the application based on statically related components and dynamically related components.

20 Claims, 2 Drawing Sheets

IDENTIFYING APPLICATION RESOURCES THROUGH IMPLICIT APPLICATION MODELS

BACKGROUND

Background and Relevant Art

Computers and computing systems have affected nearly every aspect of modern living. Computers are generally involved in work, recreation, healthcare, transportation, entertainment, household management, etc.

Computer applications are made up of numerous individual components (e.g., files, registry keys, services, web sites, users, etc) which are placed throughout the system with no clear link between the individual pieces. This disconnect between individual pieces complicates actions such as identifying application assets, backup, repair and application removal.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for determining a discrete application boundary. The method includes identifying one or more initial components of an application. The method further includes identifying statically related components of the one or more initial components of the application. The method further includes identifying dynamically related components of the one or more initial components of the application. Identifying statically related components and identifying dynamically related components is performed iteratively. The method further includes identifying a discrete boundary for the application based on statically related components and dynamically related components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality to build an implicit application model to identify an application's resources. Embodiments may include using a set of heuristics used independently or in various combinations to identify the assets associated with an arbitrary software application. Available discovery mechanisms can be used together to build an application model. The application model can be used for various purposes including but not limited to: moving a working installation of an application to another machine, verifying an installation of an application, creating a redistributable package for the application, repairing non-working or corrupted installations of the application, etc.

To build the application model, embodiments may implement identification procedures which include heuristics which can be broken down, in some example embodiments, into three categories, static discovery heuristics, dynamic discovery heuristics and selection refinement heuristics. The static methods involve examining artifacts on a system to determine a subset of the system content which belongs to the given application. The dynamic methods involve monitoring application usage to determine which resources the application accesses. The refinement methods are used to improve the application model's precision. These heuristics improve the accuracy of the application model by removing false positives detected by other identification techniques as well as augmenting the application model with additional resources which are related to the content that was discovered.

The static and dynamic techniques are focused on providing interesting content to the system. These act as entry points to the application model discovery process. The refinement techniques further process the information identified by static and dynamic discovery. Although many of the refinement techniques employ static analysis, they are called out separately from the static discovery section due to their iterative nature.

Figure 1:
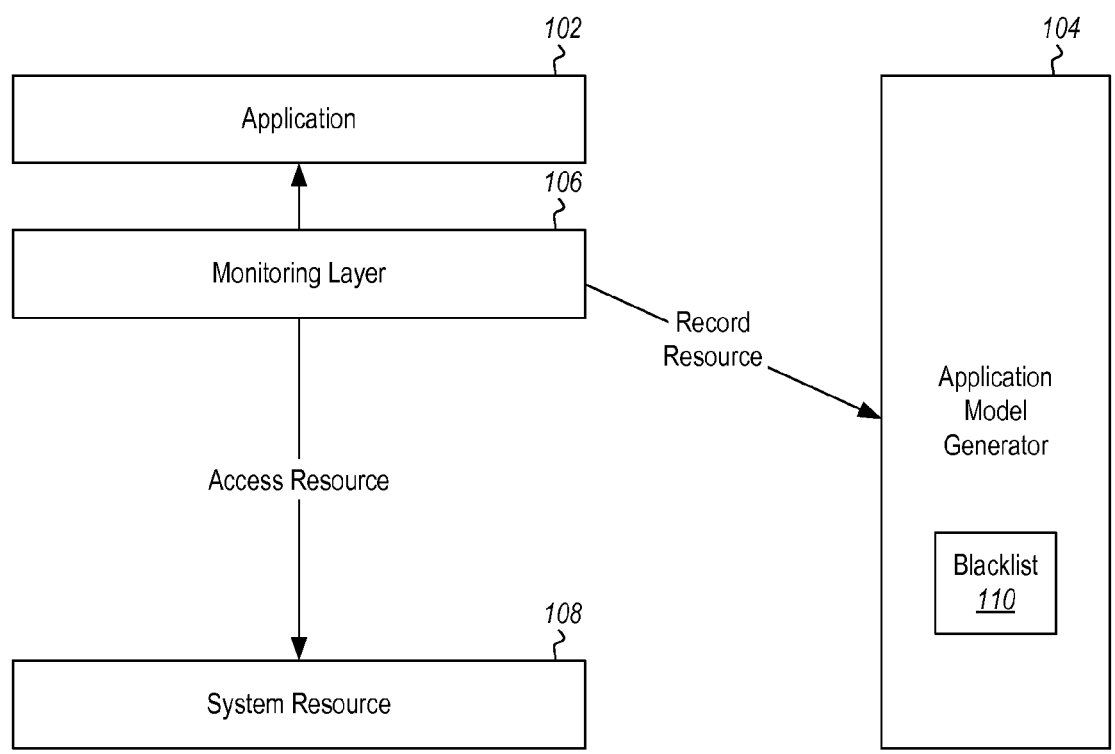
FIG. 1 illustrates an example of determining system resources.

Referring now to FIG. 1, an example is illustrated. FIG. 1 illustrates an application 102. Static discovery may be used to characterize some portions of the application 102. For example, the use of static discovery enables an application model generator 104 including a static identification module to look for application resources without actually running the application 102. This involves looking at information, such as for example, installer or uninstall data, to identify resources spread throughout a system. For example, one implementation may use MSI Windows® Installer (available from Microsoft® Corporation of Redmond Wash.) uninstall information to locate resources.

In some embodiments static discovery may additionally or alternatively include processing application file content and configuration settings (such as registry content in Windows® based applications) to locate resources. For example, a file may be referenced in an XML or other configuration document.

Dynamic discovery may be used to characterize some portions of the application 102. To better understand the application 102, embodiments may inject a monitoring layer 106 into the application 102 which effectively intercepts and interprets resource requests. In some embodiments, this monitoring layer may be implemented as a DLL which hooks a subset of system APIs to intercept file requests and/or configuration requests (such as registry requests in Windows® based applications). The monitoring layer 106 can leverage the actions of the application 102 itself to build an accurate depiction of the resources the application 102 uses to operate. This information can be provided to the application model generator 104. Embodiments may be implemented to use the monitoring layer 106 to monitor for one or more of the following actions: file access; configuration access; COM object instantiation; instrumentation usage; refinement, etc. For configuration access, some embodiments may be implemented in a Windows® environment such that configuration access may include access to registry entries. For instrumentation usage, some embodiments, may use WMI (Windows® Management Instrumentation).

Some embodiments may use one or more of two high level techniques for application model refinement, use of a blacklist 110 and implied inclusion. A blacklist 110 provides a mechanism for removing content from the application model that is not actually part of the application. Typically, this list contains content that is part of shared base system, such as shared library or configuration entries (such as shared DLLs or registry entries in applications implemented Microsoft® based systems), but it can include any content. The use of this filter may be used in streamlining the content of the application model to include only information that is truly part of the application.

There are numerous ways in which a blacklist 110 can be implemented. Some embodiments use an actively running system to produce this list. Still other embodiments may use an existing application model to populate a black list. For example, an existing model may have a blacklist associated with it identifying system (as opposed to application) resources. This existing blacklist could be used to populate other blacklists. Other data sources could additionally or alternatively be used. Some possible alternatives include, a dormant image (e.g., a virtual hard disk), a database, a text based representation and/or user provided information.

The implied inclusion technique adds to the application model by finding content related to content that has already been discovered. Some examples that may be implemented include: identification of server or service metadata based on identification of an application type; identification of services, websites and COM objects based on file inclusion; identification of local users/groups based on file ACL (access control list) information; identification of local users based on local group membership; etc. In one particular embodiment, web site data (i.e. the files that make up content for a web site) may be identified by identifying metadata from an IIS Server (Internet Information Services) available from Microsoft® Corporation of Redmond Wash.

The refinement techniques can be applied iteratively. For example, the identification of a file may lead to the addition of a local group which in turn may lead to the identification of a local user. In this case, with iterative application, picking up a single file has added the file, a local group and a local user to the application model.

Some embodiments may use a scope adjustment mechanism to perform refinement. Scope expansion can expand the scope of a particular model entry to cover a larger set of data. Illustratively, if an embodiment determines that a single file is part of an application's footprint, that embodiment might adjust scope to say that all files in the same directory as that file should be part of the footprint. For example, if it is discovered that c:\program files\my app\foo.exe is part of the application, it could be assumed that other things like c:\program files\my app\bar.ini are also part of the application because they are in the same directory.

Further, embodiments may look at the path (such as a file path, or in technologies available from Microsoft® Corporation, a registry path) for the selected item and determine how far up its parent hierarchy embodiments can traverse before hitting a resource that should not be in the model. As an example, if c:\program files\application\subdir\service.exe is in the application model. Embodiments may take this path and start walking backwards to determine if c:\program files\application\subdir should be in the model or not, followed by c:\program files\application and then c:\program files. It may be known that c:\program files should not be in the model because it is present in a blacklist. Embodiments may therefore adjust the scope of the initial entry for service.exe to cover all content in c:\program files\application, the last directory that presumably should be in the model.

In yet another example of scope adjustment, if an embodiment determines that an information service application pool is part of an application's footprint, embodiments can determine that any information service web sites that are part of the pool are also part of the application.

Alternatively or additionally, some embodiments may use dependency walking to perform refinement.

The following example illustrates one example embodiment. The example traces the impact on an application model caused by including a single file. This example starts with static analysis identifying a file (in this example, "default.aspx") for inclusion in the application model. As the file is being added to the model, implied inclusion heuristics are executed and used to identify this file as belonging to a web application. Knowing that the file belongs to a web application, additional data stores are identified which may include more information about the application, in this case an information server, that in the illustrated example is IIS available from Microsoft® Corporation of Redmond Washington. Embodiments can search through IIS for the web site that references the file and include information about the identified website in the application model as well as the other files associated with the website.

The inclusion of the website metadata and files triggers the implied inclusion heuristics on the website itself as well as the new files which have been brought into the application model. Focusing on the website itself, embodiments can determine that the website's application pool executes under a particular local user account. Embodiments can then add the user account to the application model. At the end of this procedure, embodiments will have identified numerous application assets (e.g., files, IIS metadata and local users) based on the discovery of a single file.

Embodiments may implement centralized model building which makes use of a centralized process for building the application model. This process can receive input from multiple sources and aggregate this input into a single comprehensive application model. This approach is may be useful in some embodiments because modern software applications comprise numerous processes and relying on input from a single aspect of that application may not provide the same picture as looking at the application as a whole. Although some embodiments use this centralized process for building a more comprehensive model, the techniques described are not reliant on this centralized process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
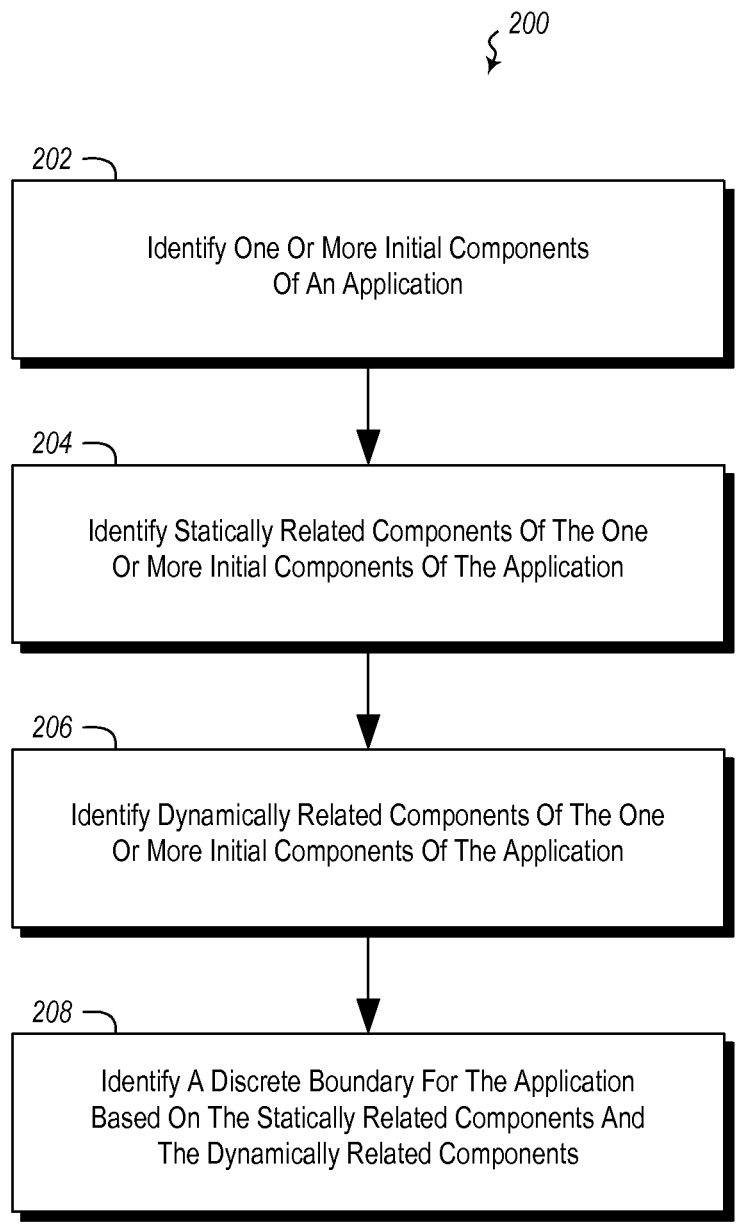
FIG. 2 illustrates a method of determining a discrete application boundary.

Referring now to FIG. 2, a method 200 is illustrated. The method 200 may be practiced in a computing environment. The method 200 includes acts for determining a discrete application boundary. The method 200 includes identifying one or more initial components of an application (act 202). For example, as illustrated above, a file associated with an application (such as "default.aspx" illustrated above) may be identified. This can be an initial starting for defining an application boundary.

The method 200 further includes identifying statically related components of the one or more initial components of the application (act 204). For example, a static analysis may be done to identify statically what components are related to the initially identified component(s). Various static analysis techniques are discussed above, as well as in examples illustrated below. Notably, identifying statically related components may be done by identifying statically related components that are directly statically related to the to initial components or by identifying statically related components that are statically related to components discovered when performing static an/or dynamic analysis.

The method 200 further includes identifying dynamically related components of the one or more initial components of the application (act 206). The method 200 may be practiced where identifying dynamically related components includes monitoring resource accesses of identified application components at runtime. FIG. 1 illustrates a monitoring layer 106 that can be used to identify dynamically related components. In particular, as illustrated above, the monitoring layer can discover dynamic calls by an application to help identify pieces of the application. Notably, identifying dynamically related components may be done by identifying dynamically related components that are directly dynamically related to the to initial components or by identifying dynamically related components that are dynamically related to components discovered when performing static an/or dynamic analysis.

Identifying statically related components (act 204) and identifying dynamically related components (act 206) can be performed iteratively. For example, analysis can be done on related components to the initial component(s) that are discovered by acts 204 and 206 to discover components related to the related components. As noted, performing static and dynamic identification iteratively may include taking the result of one pass of static or dynamic identification and applying the same heuristics to that result, generating a larger set of components to be included.

The method 200 further includes identifying a discrete boundary for the application based on statically related components and dynamically related components (act 208). In particular, the components identified through the acts of the method 200, including the initial components, can be used to identify discretely the boundaries of a particular application. For example, in some embodiments, the discrete boundary defines components needed for a functional instance of the application. For example, if all of the components identified were transferred to a different machine or device configured to host the application, the application could be made to function without adding additional application components.

The method 200 may further include creating a redistributable package based on the discrete boundary. For example, the identified components could be packaged to a redistributable package. The redistributable package could be used to deploy or repair the application. For example, the redistributable package may be placed on installation media and used to install an application. Alternatively, the redistributable package may be used by a system to identify missing, corrupted, or out of date application pieces and then using the redistributable package to replace the corrupted or missing application pieces or to supply missing application pieces.

The method 200 may further include validating at least one of the application's correctness or completeness based on components within the discrete boundary. For example, it may be known what components should be available for a given application. Comparing what components are actually available based on the analysis and what components should be available can help to determine if components are missing, corrupt, out of date, etc. In some embodiments, this may be accomplished by identifying a second discrete boundary of a different known working installation of the application. A comparison of the two different installations of the application can be compared. Further, components identified in the second discrete boundary could be used to repair missing, corrupt or outdated components in the first discrete boundary.

The method 200 may be practiced where identifying statically related components includes examining well known extension points. Such extension points may be extension points of an operating system, a server registration (such as an IIS server registration), or object registration (such as a COM registration).

The method 200 may further include blacklisting identified components to exclude components from an application boundary. For example, as illustrated in FIG. 1, a blacklist 110 may be created to remove components that may be discovered during the static and dynamic analysis, but yet are known not to be part of the application itself. For example, operating system components used by the application may be identified in the blacklist to prevent them from being included in an application boundary.

The method 200 may be practiced where identifying one or more initial components of an application includes receiving user input. In particular, a user can specify a component known to be part of an application. The specified component can then be used to identify other components of the application. Alternatively or additionally, embodiments may use installer logs, such as MSI data, to identify components of an application. In yet another alternative or additional embodiment, a whitelist may be used to identify components of an application. Such identified components can then be used to find other components.

The method 200 may be practiced where identifying a discrete boundary comprises receiving user input. For example, a user can specify particular portions of an application that belong to the application. This user input can be simply added to the discrete boundary, or used to find additional portions of an application using the modalities outline above.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of determining a discrete application boundary, the method comprising:
   identifying one or more initial components of an application;
   identifying statically related components of the one or more initial components of the application by examining installer or uninstall data, one or more extension points of an operating system, or extension points of server registration;
   identifying dynamically related components of the one or more initial components of the application by accessing resource requests from the application;
   wherein identifying statically related components and identifying dynamically related components is performed iteratively according to a scope that specifies which application components are to be considered for inclusion in the application, the scope being dynamically adjustable to include more or fewer related components, the identifying comprising impliedly including at least one additional application component that is related to a dynamically discovered component; and
   identifying a discrete boundary for the application based on the one or more initial components, the statically related components and the dynamically related components.

2. The method of claim 1, wherein the discrete boundary defines components needed for a functional instance of the application.

3. The method of claim 1, further comprising creating a redistributable package based on the discrete boundary.

4. The method of claim 1, further comprising validating at least one of the application's correctness or completeness based on components within the discrete boundary.

5. The method of claim 1, wherein identifying statically related components comprises examining well known extension points of an operating system or a component of an operating system.

6. The method of claim 1, wherein identifying statically related components comprises examining well-known relationships between resources.

7. The method of claim 1 wherein identifying dynamically related components comprises monitoring resource accesses of identified application components at runtime.

8. The method of claim 1 further comprises blacklisting identified components to exclude components from an application boundary.

9. The method of claim 1 wherein identifying one or more initial components of an application comprises receiving user input.

10. The method of claim 1 wherein identifying a discrete boundary comprises receiving user input.

11. One or more computer readable storage media comprising computer executable instructions that when executed by one or more processors perform the following:

identifying one or more initial components of an application;

identifying statically related components of the one or more initial components of the application by examining installer or uninstall data, one or more extension points of an operating system, or extension points of server registration;

identifying dynamically related components of the one or more initial components of the application by accessing resource requests from the application;

wherein identifying statically related components and identifying dynamically related components is performed iteratively according to a scope that specifies which application components are to be considered for inclusion in the application, the scope being dynamically adjustable to include more or fewer related components, the identifying comprising impliedly including at least one additional application component that is related to a dynamically discovered component; and identifying a discrete boundary for the application based on the one or more initial components, the statically related components and the dynamically related components.

12. The one or more computer readable media of claim 11, wherein the discrete boundary defines components needed for a functional instance of the application.

13. The one or more computer readable media of claim 11, further comprising creating a redistributable package based on the discrete boundary.

14. The one or more computer readable media of claim 11, further comprising validating at least one of the application's correctness or completeness based on components within the discrete boundary.

15. The one or more computer readable media of claim 11, wherein identifying dynamically related components comprises monitoring resource accesses of identified application components at runtime.

16. The one or more computer readable media of claim 11, further comprises blacklisting identified components to exclude components from the discrete application boundary.

17. The one or more computer readable media of claim 11, wherein identifying one or more initial components of an application comprises receiving user input.

18. The one or more computer readable media of claim 11, wherein identifying a discrete boundary comprises receiving user input.

19. In a computing environment, a computing system configured to determine a complete representation of components of an application, the system comprising:

a processor;

an application model generator;

a static identification module coupled to the application model generator, the static identification module configured to identifying statically related components to one or more initially identified components of the application by examining at least one of installer or uninstall data, one or more extension points of an operating system, or extension points of server registration;

a monitoring layer coupled to the application model generator, the monitoring layer configured to identifying dynamically related components of the one or more initial components of the application by accessing resource requests from the application;

wherein the application model generator is configured to cause identifying statically related components and identifying dynamically related components to be performed iteratively according to a scope that specifies which application components are to be considered for inclusion in the application, the scope being dynamically adjustable to include more or fewer related components, the identifying comprising impliedly including at least one additional application component that is related to a dynamically discovered component and wherein the application model generator is configured to identify a complete representation of components of the application based on the initially identified components, the statically related components and the dynamically related components.

20. The computing system of claim 19, further comprising a blacklist coupled to the application model generator, the blacklist identifying components that should not be included in the complete representation of components of the application.

\* \* \* \* \*